(12) United States Patent
Jang et al.

(10) Patent No.: US 9,305,602 B2
(45) Date of Patent: Apr. 5, 2016

(54) OBJECT-BASED AUDIO SYSTEM, OBJECT-BASED AUDIO PROVIDING METHOD, AND OBJECT-BASED AUDIO PLAYING METHOD USING PRESET FUNCTION

(75) Inventors: In Seon Jang, Daejeon (KR); Jeong Il Seo, Daejeon (KR); Hui Yong Kim, Daejeon (KR); Kyeong Ok Kang, Daejeon (KR); Seung Chul Ham, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 545 days.

(21) Appl. No.: 13/379,086

(22) PCT Filed: Jun. 21, 2010

(86) PCT No.: PCT/KR2010/003993
§ 371 (c)(1),
(2), (4) Date: Dec. 19, 2011

(87) PCT Pub. No.: WO2010/147442
PCT Pub. Date: Dec. 23, 2010

(65) Prior Publication Data
US 2012/0101608 A1 Apr. 26, 2012

(30) Foreign Application Priority Data

Jun. 19, 2009 (KR) .......... 10-2009-0055023
Jun. 9, 2010 (KR) .......... 10-2010-0054490

(51) Int. Cl.
*G06F 17/00* (2006.01)
*G11B 27/30* (2006.01)
*H04L 29/06* (2006.01)
*H04N 21/234* (2011.01)

(52) U.S. Cl.
CPC ....... *G11B 27/3027* (2013.01); *H04L 29/06027* (2013.01); *H04N 21/23412* (2013.01)

(58) Field of Classification Search
CPC ............. G11B 27/3027; G11B 27/034; G11B 2220/20; G11B 2220/2525; G11B 2220/2545; G11B 27/105; G11B 27/32; G11B 27/239; G11B 2220/65; G11B 27/11; G11B 27/34; H04N 9/8066; H04N 5/9267; H04N 21/234; G10L 19/0019; G10L 19/008; H04H 60/04; H04L 29/06027; H04L 65/602; H04L 65/607
See application file for complete search history.

(56) References Cited

U.S. PATENT DOCUMENTS

2005/0105555 A1* 5/2005 Oshima ............. H04L 29/06027
370/469
2010/0076577 A1* 3/2010 Lee et al. ........................ 700/94

FOREIGN PATENT DOCUMENTS

KR 1020050092688 9/2005
KR 1020060100344 9/2006
(Continued)

OTHER PUBLICATIONS

International Search Report for Application No. PCT/KR2010/003993, dated Jul. 20, 2010.

*Primary Examiner* — Fan Tsang
*Assistant Examiner* — David Siegel
(74) *Attorney, Agent, or Firm* — Nelson Mullins Riley & Scarborough LLP; Anthony A. Laurentano; Lewis Lee (57) ABSTRACT

An object-based audio system, an object-based audio providing method, and an object-based audio playback method using a preset are provided. The object-based audio system includes a reference information providing unit to provide reference information used to refer to a storage location of an object-based audio file, and a preset information providing unit to provide preset information used to control at least one audio object forming the object-based audio file.

17 Claims, 8 Drawing Sheets

(56) References Cited

FOREIGN PATENT DOCUMENTS

| | | |
|---|---|---|
| KR | 1020070047192 | 5/2007 |
| KR | 1020080095928 | 10/2008 |
| KR | 10-2009-0040245 | 4/2009 |
| KR | 10-2009-0052780 | 5/2009 |
| WO | 2010/147442 | 12/2010 |

\* cited by examiner

OBJECT-BASED AUDIO SYSTEM, OBJECT-BASED AUDIO PROVIDING METHOD, AND OBJECT-BASED AUDIO PLAYING METHOD USING PRESET FUNCTION

RELATED APPLICATIONS

This application is a 35 U.S.C. §371 filing of International Application Number PCT/KR2010/003993 which was filed on Jun. 21, 2010 and which claims priority to, and the benefit of, Korean Application Nos.: 10-2009-0055023, filed on Jun. 19, 2009 and 10-2010-0054490, filed Jun. 9, 2010. The contents of the aforementioned application are hereby incorporated herein by reference.

TECHNICAL FIELD

Embodiments of the present invention relate to an object-based audio system, an object-based audio providing method, and an object-based audio playback method using a preset.

BACKGROUND ART

Audio signals acquired from various sound sources may be synthesized with audio signals provided through a broadcast service such as a Television (TV) broadcast service, a radio broadcast service, or a Digital Multimedia broadcasting (DMB) service and accordingly, a single audio signal may be stored or transmitted. Here, a viewer may adjust an intensity of the entire audio signal, however, may not control characteristics of audio signals for each sound source, for example adjusting, for each sound source, intensities of the audio signals included in the entire audio signal. However, when audio signals for each sound source are independently stored, instead of being synthesized while writing content, the viewer may view a broadcast while controlling the intensities of the audio signals for each sound source using a terminal. As described above, an audio service enables multiple audio signals to be independently stored and transmitted in a storage/transmission unit, so that a viewer may listen to audio while properly controlling each audio signal in a receiver. The audio service is referred to as an object-based audio service.

In the object-based audio service, characteristics such as sound intensities of audio objects are defined as preset information, and may be utilized for playing back the audio signals. For example, in a Karaoke version song, a vocal with a low sound volume may be played back while sound volume of objects obtained by excluding the vocal from a preset remain unchanged, so that a user may use the Karaoke version song during singing practice. The preset information may typically be stored in a file, and the file may be transmitted. Accordingly, the preset information may be used to render various audio tracks stored in the same file.

DISCLOSURE OF INVENTION

Technical Goals

An aspect of the present invention provides an object-based audio system, an object-based audio providing system, and an object-based audio playback system that may provide preset information used to control at least one audio object forming an object-based audio file, thereby controlling each of the at least one audio object of the object-based audio file.

Another aspect of the present invention provides an object-based audio system, an object-based audio providing system, and an object-based audio playback system that may provide reference information together with preset information, and may acquire an object-based audio file based on the reference information, thereby providing an object-based audio service even when only a preset file is distributed.

Technical Solutions

According to an aspect of the present invention, there is provided an object-based audio system, including: a reference information providing unit to provide reference information, the reference information being used to refer to a storage location of an object-based audio file; and a preset information providing unit to provide preset information, the preset information being used to control at least one audio object forming the object-based audio file.

The object-based audio file may be provided based on the reference information, and the object-based audio file may be played back based on the preset information.

The reference information and the preset information may be stored in a preset file having an object-based box structure, and may be provided.

The preset file may include a preset container box, and the preset container box may include, as sub-boxes, at least one preset box for storing the preset information, and a data information box for storing the reference information.

The data information box may include, as a sub-box, a data reference box for storing information regarding the storage location of the object-based audio file among the reference information.

The reference information may be stored in a sub-box of a metadata box, and the metadata box may be a box in the preset file, or a sub-box of a moov box that is a container for all metadata among boxes in the preset file.

The metadata box may include a data information box for storing the reference information, and information regarding the storage location of the object-based audio file among the reference information stored in the data information box may be stored in a data reference box that is a sub-box of the data information box.

According to another aspect of the present invention, there is provided an object-based audio system, including: an information receiver to receive reference information and preset information, the reference information being used to refer to a storage location of an object-based audio file, and the preset information being used to control at least one audio object forming the object-based audio file; a file receiver to receive the object-based audio file based on the reference information; and a file playback unit to play back the object-based audio file based on the preset information.

According to still another aspect of the present invention, there is provided an object-based audio system, including: a preset information generator to generate preset information, the preset information being used to control at least one audio object forming the object-based audio file; a preset file generator to generate a preset file, the preset file including the preset information and reference information, the reference information being used to refer to a storage location of the object-based audio file; and a file providing unit to provide the preset file.

According to yet another aspect of the present invention, there is provided an object-based audio providing method, including: providing reference information, the reference information being used to refer to a storage location of an object-based audio file; and providing preset information, the preset information being used to control at least one audio object forming the object-based audio file.

According to a further aspect of the present invention, there is provided an object-based audio providing method, including: receiving reference information and preset information, the reference information being used to refer to a storage location of an object-based audio file, and the preset information being used to control at least one audio object forming the object-based audio file; receiving the object-based audio file based on the reference information; and playing back the object-based audio file based on the preset information.

According to a further aspect of the present invention, there is provided an object-based audio providing method, including: generating preset information, the preset information being used to control at least one audio object forming the object-based audio file; generating a preset file, the preset file including the preset information and reference information, the reference information being used to refer to a storage location of the object-based audio file; and providing the preset file.

According to a further aspect of the present invention, there is provided a file structure to store reference information and preset information, the reference information being used to refer to a storage location of an object-based audio file, and the preset information being used to control at least one audio object forming the object-based audio file.

Effect of the Invention

According to embodiments of the present invention, it is possible to provide preset information used to control at least one audio object forming an object-based audio file, thereby controlling each of the at least one audio object of the object-based audio file.

Additionally, according to embodiments of the present invention, it is possible to provide reference information together with preset information, and to acquire an object-based audio file based on the reference information, thereby providing an object-based audio service even when only a preset file is distributed.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments of the present invention relate to an object-based audio system, an object-based audio providing method, and an object-based audio playback method that may provide preset information together with reference information that is used to refer to a storage location of an object-based audio file in an object-based audio service, so that a user receiving the preset information and the reference information may receive the object-based audio file based on the reference information and may play back the object-based audio file based on the preset information. Here, the preset information may refer to information used to control at least one audio object forming the object-based audio file. For example, in an object-based audio service according to embodiments of the present invention, an audio object corresponding to a vocal portion in an object-based audio file of a Karaoke version song may be controlled to have a reduced sound volume, and the other audio objects may be controlled to have an unchanged sound volume. In this example, the object-based audio service may be usefully used when a user practices singing a song.

The preset information may be generated by an original creator of the object-based audio file, as well as by a user that receives the object-based audio file. When the preset information is distributed, the reference information may be provided together with the preset information. Accordingly, it is possible to provide a user that receives the preset information with the object-based audio file using the reference information, even when the object-based audio file is not distributed.

Hereinafter, an object-based audio service using present information and reference information will be described. Here, the object-based audio service may be based on an International Organization for Standardization Base Media File Format (ISO-BMFF) file format. However, it is quite obvious that the object-based audio service is expandable to all file formats for storing multimedia data, for example a Moving Picture Experts Group layer 4 (MP4) file, on the same basis.

An example of a file structure of an object-based audio file used in the present embodiment will be described with reference to FIG. 1 and Table 1 below.

Figure 1:
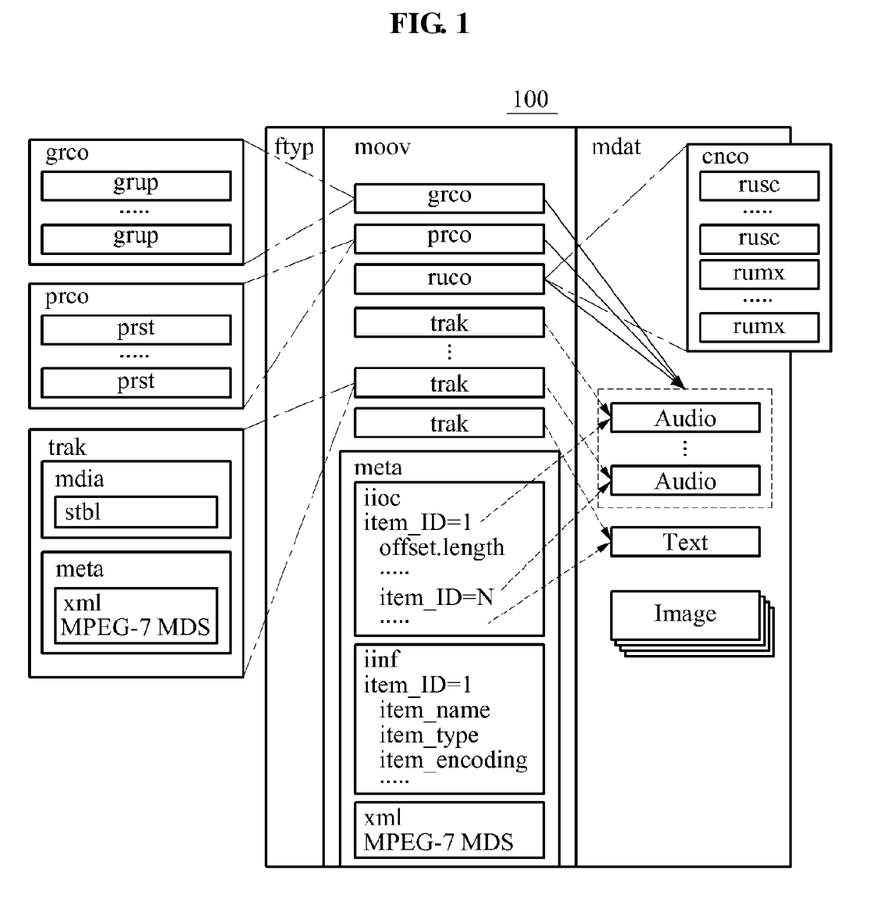
FIG. 1 is a diagram illustrating an example of a file structure of an object-based audio file according to an embodiment of the present invention.

FIG. 1 illustrates a file structure 100 of an object-based audio file according to an embodiment of the present invention. A file structure of a preset file according to an embodiment of the present invention may be derived from the file structure 100 of the object-based audio file of FIG. 1. The file structure of the preset file will be further described below with reference to FIG. 2.

First, the file structure 100 of the object-based audio file may have an object-based box structure, such as an 'ftyp' box, a 'moov' box, and an 'mdat' box. Table 1 shows boxes in the file structure 100 of the object-based audio file, and descriptions of the boxes.

TABLE 1

| Boxes | | | | | | Descriptions |
|---|---|---|---|---|---|---|
| ftyp | | | | | | File type and compatibility |
| moov | | | | | | Container for all metadata |
| | mvhd | | | | | Movie header, Overall declarations |
| | trak | | | | | Container for an individual track or stream |
| | | tkhd | | | | Track header, Overall information about the track |
| | | tref | | | | Track reference container |
| | | edts | | | | Edit list container |
| | | | elst | | | Edit list |
| | | mdia | | | | Container for media information in a track |
| | | | mdhd | | | Media header, Overall information about the media |
| | | | hdlr | | | Handler, Declares the media (handler) type "soun" for audio data "text" for timed text data "hint" for protocol hint track |
| | | | minf | | | Media information container |
| | | | | smhd | | Sound media header, Overall information (sound track only) |
| | | | | hmhd | | Hint media header, Overall information (hint track only) |
| | | | | nmhd | | Null media header, Overall information (some tracks only) |
| | | | | dinf | | Data information box, Container |
| | | | | | dref | Data reference box, Declares source(s) of media data in track |
| | | | | stbl | | Sample table box, Container for the time/space map |
| | | | | | stsd | Sample descriptions (codec types, initialization, etc.) |
| | | | | | stts | (Decoding) time-to-sample |
| | | | | | stsc | Sample-to-chunk, Partial data-offset information |
| | | | | | stsz | Sample sizes (framing) |
| | | | | | stz2 | Compact sample sizes (framing) |
| | | | | | stco | Chunk offset, partial data-offset information |
| | | | | | co64 | 64-bit chunk offset |
| | grco | | | | | Container for groups |
| | | grup | | | | Group box, Describes the structure (hierarchy) |
| | prco | | | | | Container for the presets |
| | | prst | | | | Preset box, Container for the preset information |
| | | dinf | | | | Data information box, Container |
| | | | dref | | | Data reference box, Declares source(s) of media data in track |
| | ruco | | | | | Container for rules |
| | | rusc | | | | Selection rule box, Container for a selection rule |
| | | rumx | | | | Mixing rule box, Container for a mixing rule |
| mdat | | | | | | Media data container |
| free | | | | | | Free space |
| skip | | | | | | Free space |
| meta | | | | | | Metadata |
| | hdlr | | | | | Handler, Declares the media (handler) type |
| | dinf | | | | | Data information box, Container |
| | | dref | | | | Data reference box, Declares source(s) of metadata items |
| | iloc | | | | | Item location |
| | iinf | | | | | Item information |
| | xml | | | | | XML container |
| | bxml | | | | | Binary XML container |
| | pitm | | | | | Primary item reference |

In Table 1, a box in a rightward column may represent a sub-box of a box in a leftward column. For example, in Table 1, an 'mvhd' box in a fourth row and second column may be a sub-box of a 'moov' box in a third row and first column.

To store preset information and reference information in an ISO-BMFF-based preset file, one of the below two schemes may be used. Here, the reference information stored in the preset file may be used to refer to the object-based audio file, and the preset information stored in the preset file may be used to control at least one audio object forming a related object-based audio file.

In the first scheme, the object-based audio system according to an embodiment of the present invention may store the reference information in a metadata box that is referred to as 'meta' box and that exists in the preset file, or in a 'meta' box that exists in a 'moov' box. For example, when the 'meta' box is included in the preset file, the reference information may be stored based on a data information box and a data reference box that are sub-boxes of the 'meta' box, as indicated in the ISO-BMFF.

In the second scheme, the object-based audio system according to an embodiment of the present invention may store the reference information in a sub-box of a preset container box that is referred to as a 'prco' box and that is a container for preset. Here, both of a preset box for storing the preset information and a box for storing the reference information may be stored in the 'prco' box. In other words, since information for playback is stored in a single box, rather than being separated, the information may be more efficiently parsed during a playback and editing of the object-based audio file. For example, the reference information may be stored in a data information box on a $31^{st}$ row and $3^{rd}$ column, and in a data reference box on a $32^{nd}$ row and $4^{th}$ column in Table 1. In this example, the data information box and the data reference box, as indicated in the ISO-BMFF, may be modified as shown in Tables 2 and 3.

TABLE 2

Data Information Box

Container: Media Information Box('minf') or Meta Box('meta')
Mandatory: Yes (required within 'minf' box or 'prco' box) and No (optional within 'meta' box)
Quantity: Exactly one
Syntax aligned(8) class DataInformationBox extends Box('dinf') {
}

TABLE 3

Data Reference Box

Box Types: "url', 'urn', 'dref'
Container: data Information Box('dinf')
Mandatory: Yes
Quantity: Exactly one
Syntax aligned(8) class DataEntryUrlBox(bit(24) flags) extends FullBox ('url', version = 0, flags){
    string location;
}
aligned(8) class DataEntryUrnBox(bit(24) flags) extends FullBox('urn', version = 0, flags){
    string name;
    string location;
}
aligned(8) class DataReferenceBox extends FullBox('dref', version = 0, 0){
    unsigned int(32) entry_count;
    for(i=0; i ≤ entry_count; i++){
        DataEntryBox(entry_version, entry_flags) data_entry;
    }
}

Figure 2:
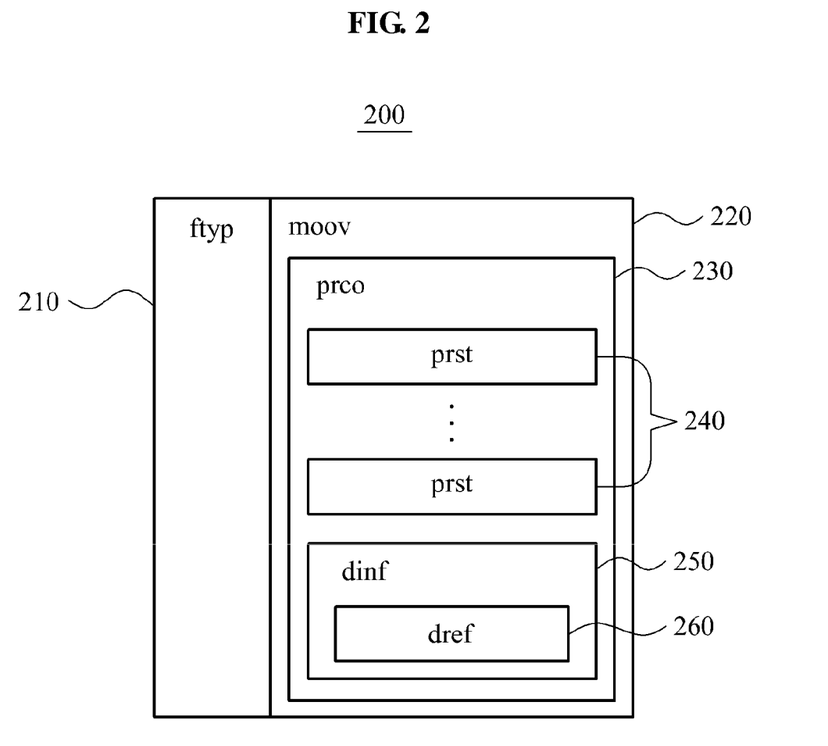
FIG. 2 is a diagram illustrating an example of a structure of a preset file according to an embodiment of the present invention.

FIG. 2 illustrates a structure 200 of a preset file. The structure 200 of the preset file may broadly include a file type box (hereinafter, referred to as an 'ftyp' box) 210, and a 'moov' box 220. The 'moov' box 220 may include, as a sub-box, a 'prco' box 230 for preset. Here, the structure 200 of the preset file may correspond to a file structure of a preset file based on the above-described second scheme.

The 'prco' box 230 may include at least one preset box that is referred to as a 'prst' box 240 and that may be used to store preset information. Additionally, the 'prco' box 230 may include, as a sub-box, a data information box (hereinafter, referred to as a 'dinf' box) 250.

The 'dinf' box 250 may be used to store reference information, and may include, as a sub-box, a data reference box (hereinafter, referred to as a 'dref' box) 260. Here, the 'dref' box 260 may be storage information regarding a storage location of the object-based audio file among the reference information. The information regarding the storage location may include, for example, information regarding a Uniform/Universal Resource Locator (URL) or a Uniform Resource Name (URN) of the object-based audio file.

Accordingly, when the preset file is received, an object-based audio playback system may receive a corresponding object-based audio file based on information regarding a URL or a URL that is stored in the 'dref' box 260, and may play back the received object-based audio file based on the preset information stored in the 'prst' box 240. In other words, there is no need to distribute the object-based audio file during distribution of the preset file and thus, it is possible to more efficiently distribute the preset file with a smaller size. Additionally, when the first scheme is used as described above, both of the preset information and the reference information may be stored in the preset file and thus, a user may distribute only the preset file without needing to distribute the object-based audio file.

Alternatively, when the second scheme is used as described above, the preset information and the reference information that are used for playback of the object-based audio file may be stored in a single box (for example, the 'prco' box 240), rather than being separated. Accordingly, it is possible to more efficiently parse the preset information and the reference information during the playback and editing of the object-based audio file.

As described with reference to FIGS. 1 and 2, the preset information and the reference information may be stored in a single preset file, and may be transmitted. In other words, since the preset information and the reference information may be transmitted together, there is no need to transmit the object-based audio file. However, there is no limitation thereto and accordingly, the preset invention the preset information and the reference information may be stored in different files.

Figure 3:
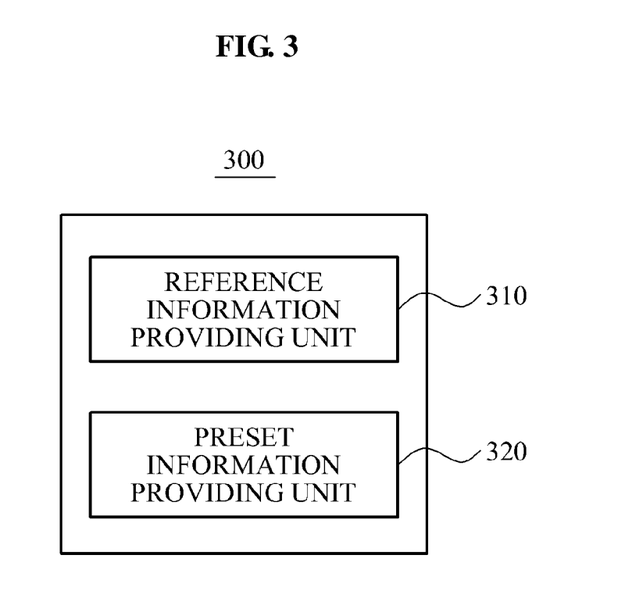
FIG. 3 is a block diagram illustrating an internal configuration of an object-based audio system for providing preset information and reference information according to an embodiment of the present invention.

FIG. 3 is a block diagram illustrating an internal configuration of an object-based audio system 300 for providing preset information and reference information according to an embodiment of the present invention. In FIG. 3, the object-based audio system 300 includes a reference information providing unit 310 and a preset information providing unit 320.

The reference information providing unit 310 may provide the reference information used to refer to a storage location of an object-based audio file. Here, the object-based audio file may be provided based on the reference information.

The preset information providing unit 320 may provide the preset information used to control at least one audio object forming the object-based audio file. Here, the provided object-based audio file may be played back based on the preset information.

In other words, the object-based audio system 300 may be implemented as an audio system to provide reference information and preset information. Here, the audio system may receive an object-based audio file provided based on received reference information, and may play back the object-based audio file based on provided preset information.

As described above with reference to FIGS. 1 and 2, the object-based audio system 300 may store the reference information and the preset information in a preset file having an object-based box structure, and may provide the reference information and the preset information.

In one example, the preset file may include a 'prco' box. The 'prco' box may include, as sub-boxes, at least one 'prst' box for storing the preset information, and a 'dinf' box for storing the reference information. Additionally, the 'dinf' box may include, as a sub-box, a 'dref' box for storing information regarding the storage location of the object-based audio file among the reference information.

In another example, the reference information may be stored in a sub-box of a 'meta' box. Here, the 'meta' box may be included in a preset file, or may be included as a sub-box in a 'moov' box that is a container for all metadata among boxes in the preset box. The 'meta' box may include a 'dinf' box for storing reference information, and information regarding the storage location of the object-based audio file among the reference information stored in the 'dinf' box may be stored in a 'dref' box that is a sub-box of the 'dinf' box. In this example, the preset file may include a 'prco' box that is a container for preset, and the preset information may be stored in a 'prst' box that is a sub-box of the 'prco' box.

Figure 4:
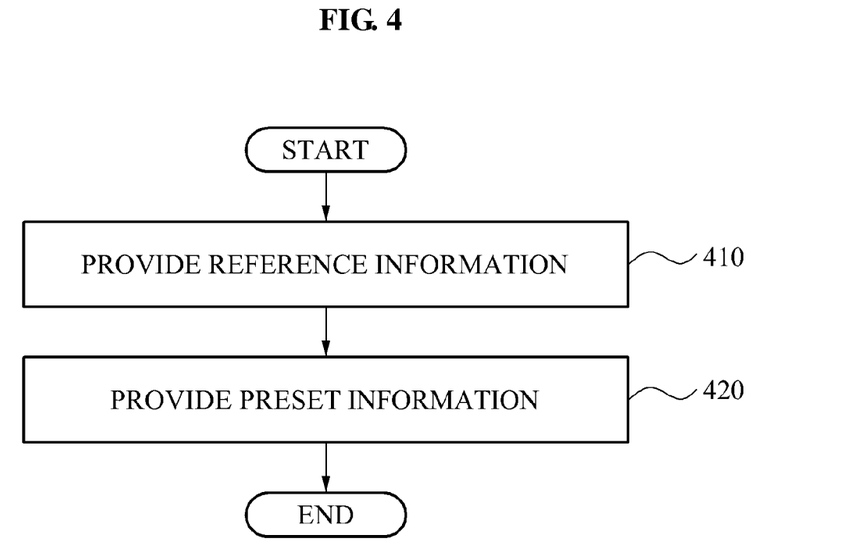
FIG. 4 is a flowchart illustrating an object-based audio providing method for providing preset information and reference information according to an embodiment of the present invention.

FIG. 4 is a flowchart illustrating an object-based audio providing method to provide preset information and reference information according to an embodiment of the present invention. The object-based audio providing method of FIG. 4 may be performed by the object-based audio system 300 described with reference to FIG. 3. Hereinafter, operations of the object-based audio providing method of FIG. 4 performed by the object-based audio system 300 will be described.

In operation 410, the object-based audio system 300 may provide reference information used to refer to a storage location of an object-based audio file. Here, the object-based audio file may be provided based on the reference information.

In operation 420, the object-based audio system 300 may provide the preset information used to control at least one audio object forming the object-based audio file. Here, the provided object-based audio file may be played back based on the preset information.

In other words, the object-based audio system 300 may be implemented as an audio system to provide reference information and preset information through operations 410 and 420. Here, the audio system may receive an object-based audio file provided based on received reference information, and may play back the object-based audio file based on provided preset information.

As described above with reference to FIGS. 1 and 2, the object-based audio system 300 may store the reference information and the preset information in a preset file having an object-based box structure, and may provide the reference information and the preset information.

In one example, the preset file may include a 'prco' box. The 'prco' box may include, as sub-boxes, at least one 'prst' box for storing the preset information, and a 'dinf' box for storing the reference information. Additionally, the 'dinf' box may include, as a sub-box, a 'dref' box for storing information regarding the storage location of the object-based audio file among the reference information.

In another example, the reference information may be stored in a sub-box of a 'meta' box. Here, the 'meta' box may be included in a preset file, or may be included as a sub-box in a 'moov' box that is a container for all metadata among boxes in the preset box. The 'meta' box may include a 'dinf' box for storing reference information, and information regarding the storage location of the object-based audio file among the reference information stored in the 'dinf' box may be stored in a 'dref' box that is a sub-box of the 'dinf' box. In this example, the preset file may include a 'prco' box that is a container for preset, and the preset information may be stored in a 'prst' box that is a sub-box of the 'prco' box.

Figure 5:
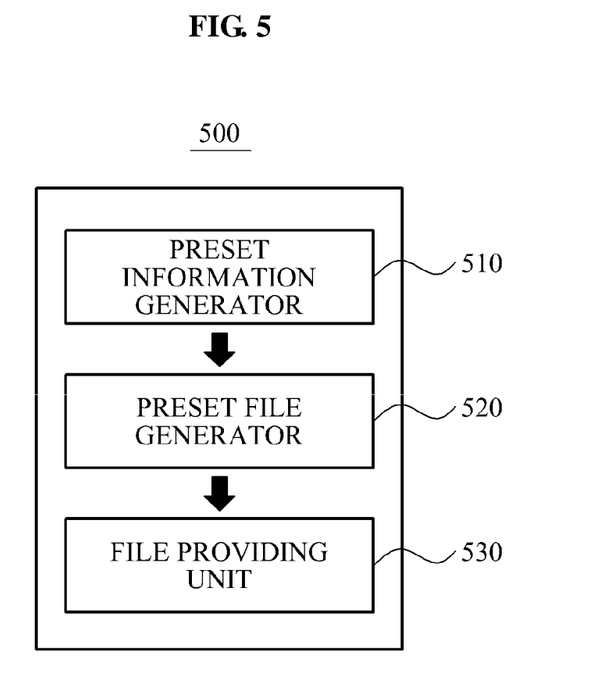
FIG. 5 is a block diagram illustrating an internal configuration of an object-based audio system for providing a preset file according to an embodiment of the present invention.

FIG. 5 is a block diagram illustrating an internal configuration of an object-based audio system 500 for providing a preset file according to an embodiment of the present invention. In FIG. 5, the object-based audio system 500 includes a preset information generator 510, a preset file generator 520, and a file providing unit 530.

The preset information generator 510 may generate preset information used to control at least one audio object forming an object-based audio file.

The preset file generator 520 may generate a preset file that includes the preset information and reference information. Here, the reference information may be used to refer to a storage location of the object-based audio file.

In one embodiment, the preset file may have an object-based box structure, and the preset information and the reference information may be stored in different sub-boxes in an identical box. For example, the preset information and the reference information may be respectively stored in the 'prst' box 240 and the 'dinf' box 250 that have been described with reference to FIG. 2. Both of the 'prst' box 240 and the 'dinf' box 250 may be included as sub-boxes in the 'prco' box 230 of FIG. 2.

Here, to store information regarding a playback of the object-based audio file in an identical box, the preset information and the reference information may be stored in different sub-boxes in the identical box. In another embodiment, the preset information and the reference information may be included in different boxes. An example where the preset information and the reference information are included in different boxes has been described above and accordingly, overlapping description thereof is omitted herein.

The file providing unit 530 may provide the preset file. An audio system for receiving the provided preset file may receive the object-based audio file based on the reference information stored in the preset file, and may play back the received object-based audio file based on the preset information stored in the preset file. Accordingly, it is possible to more efficiently distribute the preset file without a need to distribute the object-based audio file together.

Figure 6:
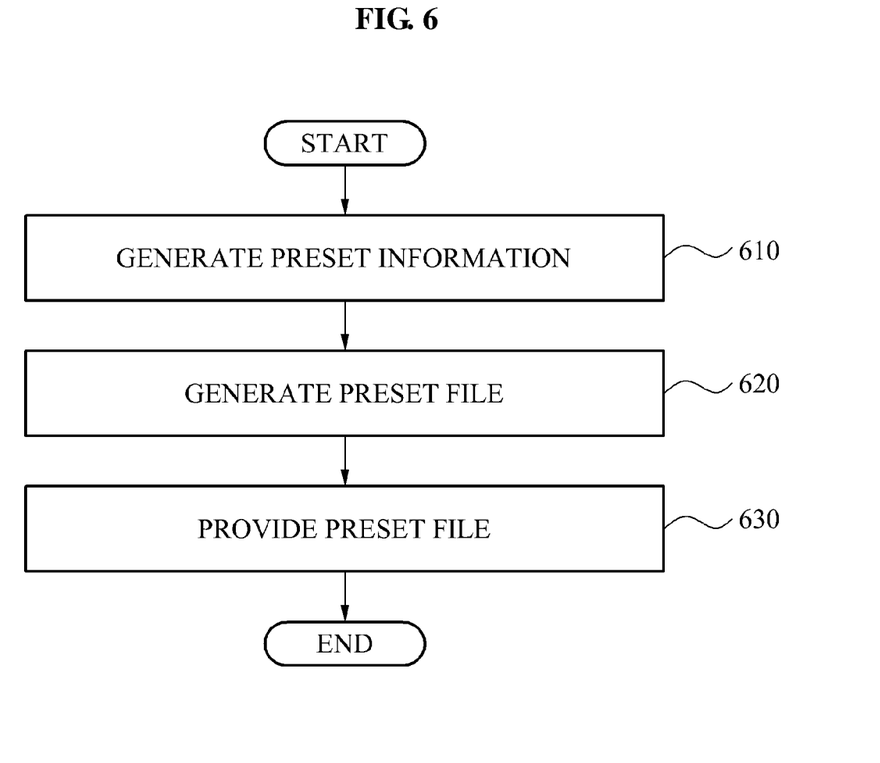
FIG. 6 is a flowchart illustrating an object-based audio providing method for providing a preset file according to an embodiment of the present invention.

FIG. 6 is a flowchart illustrating an object-based audio providing method to provide a preset file according to an embodiment of the present invention. The object-based audio providing method of FIG. 6 may be performed by the object-based audio system 500 described with reference to FIG. 5. Hereinafter, operations of the object-based audio providing method of FIG. 6 performed by the object-based audio system 500 will be described.

In operation 610, the object-based audio system 500 may generate preset information used to control at least one audio object forming an object-based audio file.

In operation 620, the object-based audio system 500 may generate a preset file that includes the preset information and reference information. Here, the reference information may be used to refer to a storage location of the object-based audio file.

In one embodiment, the preset file may have an object-based box structure, and the preset information and the reference information may be stored in different sub-boxes in an identical box. For example, the preset information and the reference information may be respectively stored in the 'prst' box 240 and the 'dinf' box 250 that have been described with reference to FIG. 2. Both of the 'prst' box 240 and the 'dinf' box 250 may be included as sub-boxes in the 'prco' box 230 of FIG. 2.

Here, to store information regarding a playback of the object-based audio file in an identical box, the preset information and the reference information may be stored in different sub-boxes in the identical box. In another embodiment, the preset information and the reference information may be included in different boxes. An example where the preset information and the reference information are included in different boxes has been described above and accordingly, overlapping description thereof is omitted herein.

In operation 630, the object-based audio system 500 may provide the preset file. An audio system for receiving the provided preset file may receive the object-based audio file based on the reference information stored in the preset file, and may play back the received object-based audio file based on the preset information stored in the preset file. Accordingly, it is possible to more efficiently distribute the preset file without a need to distribute the object-based audio file together.

Figure 7:
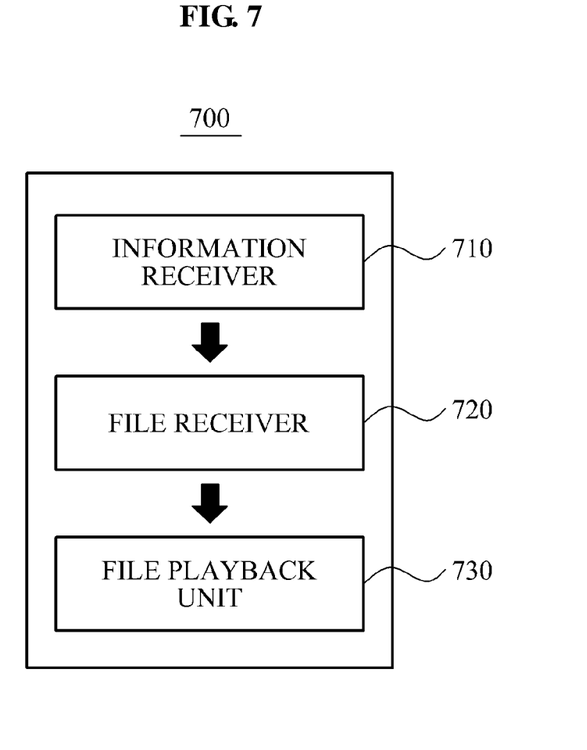
FIG. 7 is a block diagram illustrating an internal configuration of an object-based audio system for playing back an object-based audio file according to an embodiment of the present invention.

FIG. 7 is a block diagram illustrating an internal configuration of an object-based audio system 700 for playing back an object-based audio file according to an embodiment of the present invention. In FIG. 7, the object-based audio system 700 includes an information receiver 710, a file receiver 720, and a file playback unit 730.

The information receiver 710 may receive reference information and preset information. Here, the reference information may be used to refer to a storage location of an object-based audio file, and the preset information may be used to control at least one audio object forming the object-based audio file. Specifically, a system for transmitting the reference information and the preset information may store the reference information and the preset information in the preset file having an object-based box structure, and may transmit the preset file to the object-based audio system 700. In other words, the information receiver 710 may receive the preset file, to receive the reference information and the preset information.

The file receiver 720 may receive the object-based audio file based on the reference information. The reference information may include information regarding the storage location of the object-based audio file, and may include, for example, a URL or a URN of the object-based audio file. In other words, the file receiver 720 may receive the object-based audio file based on the information regarding the storage location of the object-based audio file.

The file playback unit 730 may play back the object-based audio file based on the preset information. As described above, the preset information may be used to control at least one audio object forming the object-based audio file. Specifically, the file playback unit 730 may control, based on the preset information, at least one corresponding audio object among audio objects that form the object-based audio file. Additionally, the file playback unit 730 may play back at least one part of, or all of the audio objects including the controlled audio object.

Figure 8:
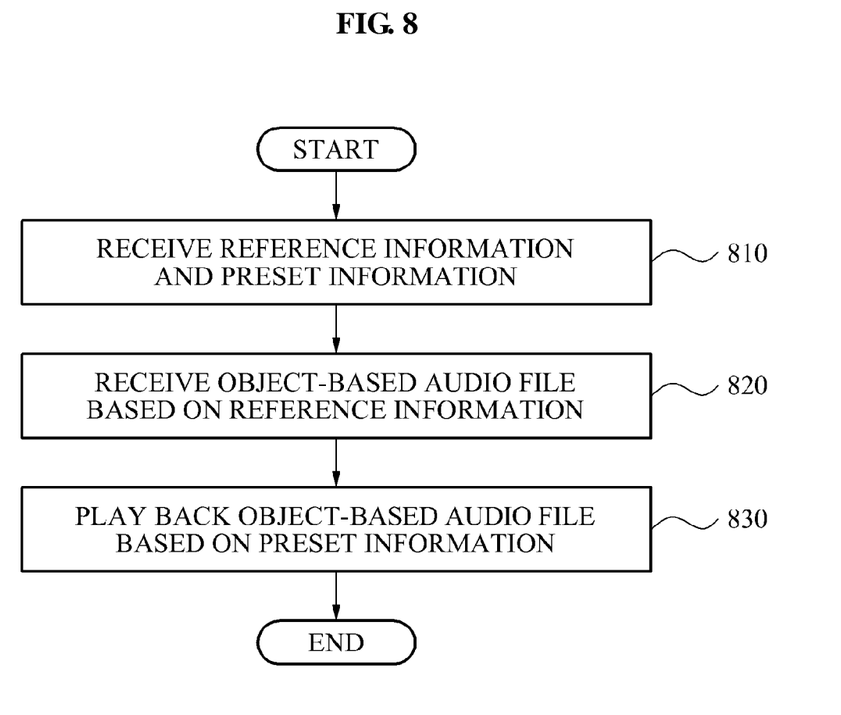
FIG. 8 is a flowchart illustrating a method of playing back an object-based audio file according to an embodiment of the present invention.

FIG. 8 is a flowchart illustrating a method of playing back an object-based audio file according to an embodiment of the present invention. The method of FIG. 8 may be performed by the object-based audio system 700 described with reference to FIG. 7. Hereinafter, operations of the method of FIG. 8 performed by the object-based audio system 700 will be described.

In operation 810, the object-based audio system 700 may receive reference information and preset information. Here, the reference information may be used to refer to a storage location of an object-based audio file, and the preset information may be used to control at least one audio object forming the object-based audio file. Specifically, a system for transmitting the reference information and the preset information may store the reference information and the preset information in the preset file having an object-based box structure, and may transmit the preset file to the object-based audio system 700. In other words, the object-based audio system 700 may receive the preset file, to receive the reference information and the preset information.

In operation 820, the object-based audio system 700 may receive the object-based audio file based on the reference information. The reference information may include information regarding the storage location of the object-based audio file, and may include, for example a URL or a URN of the object-based audio file. In other words, the object-based audio system 700 may receive the object-based audio file based on the information regarding the storage location of the object-based audio file.

In operation 830, the object-based audio system 700 may play back the object-based audio file based on the preset information. As described above, the preset information may be used to control at least one audio object forming the object-based audio file. Specifically, the object-based audio system 700 may control, based on the preset information, at least one corresponding audio object among audio objects that form the object-based audio file. Additionally, the object-based audio system 700 may play back at least one part of, or all of the audio objects including the controlled audio object.

As described above, according to the embodiments of the present invention, it is possible to provide preset information used to control at least one audio object to forming an object-based audio file, thereby controlling each of the at least one audio object of the object-based audio file. Additionally, it is possible to provide reference information together with preset information, and to acquire an object-based audio file based on the reference information, thereby providing an object-based audio service even when only a preset file is distributed.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Additionally, the above-described file structures may also be recorded in non-transitory computer-readable media. For example, a file structure for storing reference information used to refer to a storage location of an object-based audio file, and preset information used to control at least one audio object forming the object-based audio file may be recorded in non-transitory computer-readable media. In this example, the object-based audio file may be provided based on the reference information, and may be played back based on the preset information. Additionally, the file structure may include an object-based box structure, and the reference information and the preset information may be stored in different sub-boxes in an identical box. The file structure has been described above with reference to FIGS. 1 through 8.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An object-based audio providing system comprising one or more processors configured to embody a plurality of functional units including:
   a reference information providing unit to provide an object-based audio playback system with reference information, the reference information being used to refer to a storage location of an object-based audio file; and
   a preset information providing unit to provide an object-based audio playback system with preset information, the preset information being used to control at least one audio object forming the object-based audio file,
   wherein the object-based audio file is not distributed to the object-based audio playback system,
   wherein each of the reference information and the preset information is stored in respective boxes,
   wherein the reference information and the preset information are stored in a preset file having an object-based box structure,
   wherein the preset information and the reference information are stored in different sub-boxes in an identical box.

2. The object-based audio providing system of claim 1, wherein the object-based audio file is provided based on the reference information, and
   wherein the object-based audio file is played back based on the preset information.

3. The object-based audio providing system of claim 1, wherein the preset file comprises a preset container box, and
   wherein the preset container box comprises, as sub-boxes, at least one preset box for storing the preset information, and a data information box for storing the reference information.

4. The object-based audio providing system of claim 3, wherein the data information box comprises, as a sub-box, a data reference box for storing information regarding the storage location of the object-based audio file among the reference information.

5. The object-based audio providing system of claim 1, wherein the reference information is stored in a sub-box of a metadata box, and
   wherein the metadata box is a box in the preset file, or a sub-box of a moov box that is a container for all metadata among boxes in the preset file.

6. The object-based audio providing system of claim 5, wherein the metadata box comprises a data information box for storing the reference information, and
   wherein information regarding the storage location of the object-based audio file among the reference information stored in the data information box is stored in a data reference box that is a sub-box of the data information box.

7. An object-based audio playback system comprising one or more processors configured to embody a plurality of functional units including:
   an information receiver to receive reference information and preset information from an object-based audio providing system, the reference information being used to refer to a storage location of an object-based audio file, and the preset information being used to control at least one audio object forming the object-based audio file;
   a file receiver to receive the object-based audio file based on the reference information; and
   a file playback unit to play back the object-based audio file based on the preset information,
   wherein the object-based audio file is not distributed from the object-based audio providing system,
   wherein each of the reference information and the preset information is stored in respective boxes,
   wherein the reference information and the preset information are stored in a preset file having an object-based box structure,
   wherein the preset information and the reference information are stored in different sub-boxes in an identical box.

8. The object-based audio playback system of claim 7, wherein the information receiver receives the preset file.

9. An object-based audio providing system, comprising:
   a preset information generator to generate preset information, the preset information being used to control at least one audio object forming the object-based audio file;
   a preset file generator to generate a preset file, the preset file comprising the preset information and reference information, the reference information being used to refer to a storage location of the object-based audio file; and
   a file providing unit to provide an object-based audio playback system with the preset file,
   wherein the object-based audio file is not distributed to the object-based audio playback system,
   wherein each of the reference information and the preset information is stored in respective boxes,
   wherein the preset file has an object-based box structure,
   wherein the preset information and the reference information are stored in different sub-boxes in an identical box.

10. An object-based audio providing method, wherein the method is performed by one or more processors included in an object-based audio providing system, comprising:
    providing an object-based audio playback system with reference information, the reference information being used to refer to a storage location of an object-based audio file; and
    providing an object-based audio playback system with preset information, the preset information being used to control at least one audio object forming the object-based audio file,
    wherein the object-based audio file is not distributed to the object-based audio playback system,
    wherein each of the reference information and the preset information is stored in respective boxes,
    wherein the reference information and the preset information are stored in a preset file having an object-based box structure,
    wherein the preset information and the reference information are stored in different sub-boxes in an identical box.

11. The object-based audio providing method of claim 10, wherein the object-based audio file is provided based on the reference information, and wherein the object-based audio file is played back based on the preset information.

12. The object-based audio providing method of claim 10, wherein the reference information and the preset information are stored in a preset file having an object-based box structure, and are provided.

13. An object-based audio playback method, wherein the method is performed by one or more processors included in an object-based audio playback system, comprising:
    receiving reference information and preset information from an object-based audio providing system, the reference information being used to refer to a storage location of an object-based audio file, and the preset information being used to control at least one audio object forming the object-based audio file;

receiving the object-based audio file based on the reference information; and playing back the object-based audio file based on the preset information, wherein the object-based audio file is not distributed from the object-based audio providing system, wherein each of the reference information and the preset information is stored in respective boxes, wherein the reference information and the preset information are stored in a preset file having an object-based box structure, wherein the preset information and the reference information are stored in different sub-boxes in an identical box.

14. An object-based audio providing method performed by an object-based audio providing system, comprising:

generating preset information, the preset information being used to control at least one audio object forming the object-based audio file;

generating a preset file, the preset file comprising the preset information and reference information, the reference information being used to refer to a storage location of the object-based audio file; and providing an object-based audio playback system with the preset file, wherein the object-based audio file is not distributed to the object-based audio playback system, wherein each of the reference information and the preset information is stored in respective boxes, wherein the reference information and the preset information are stored in a preset file having an object-based box structure, wherein the preset information and the reference information are stored in different sub-boxes in an identical box.

15. A non-transitory computer readable recording medium storing a program to cause a computer to implement the method of any one of claim 10.

16. A non-transitory computer readable recording medium storing a file structure to store reference information and preset information, the non-transitory computer readable recording medium performed by an object-based audio playback system, the reference information being used to refer to a storage location of an object-based audio file, and the preset information being used to control at least one audio object forming the object-based audio file, wherein the object-based audio playback system receives an object-based audio file based on the reference information, and controls the object-based audio file based on the preset information, wherein the object-based audio file is not distributed to the object-based audio playback system, wherein each of the reference information and the preset information is stored in respective boxes, wherein the file structure comprises an object-based file structure, wherein the reference information and the preset information are stored in different sub-boxes in an identical box.

17. The non-transitory computer readable recording medium of claim 16, wherein the object-based audio file is provided based on the reference information, and wherein the object-based audio file is played back based on the preset information.

* * * * *